(12) United States Patent
Cameron et al.

(10) Patent No.: US 12,199,999 B2
(45) Date of Patent: Jan. 14, 2025

(54) FLOWSPEC MESSAGE PROCESSING APPARATUS AND METHOD

(71) Applicant: Arbor Networks, Inc., Westford, MA (US)

(72) Inventors: Scott Cameron, Chicago, IL (US); Danielle Fritz, Canton, MI (US); Mitchell Hoffmeyer, Ann Arbor, MI (US); Scott Iekel-Johnson, Ann Arbor, MI (US); Andrew Inman, Ann Arbor, MI (US); Grant Levene, Chicago, IL (US); Jiasi Li, Bethesda, MD (US); William Martin Northway, Jr., Ypsilanti, MI (US); Ryan O'Rielly, Ann Arbor, MI (US); Michael Ratanatharathorn, Whitmore Lake, MI (US); Lori Sulik, Taylor, MI (US); Chris Thiele, Livonia, MI (US); James Edward Winquist, Ypsilanti, MI (US)

(73) Assignee: ARBOR NETWORKS, INC., Westford, MA (US)

( * ) Notice: Subject to any disclaimer, the term of this patent is extended or adjusted under 35 U.S.C. 154(b) by 340 days.

(21) Appl. No.: 17/712,407

(22) Filed: Apr. 4, 2022

(65) Prior Publication Data
US 2023/0319082 A1   Oct. 5, 2023

(51) Int. Cl.
*H04L 9/40* (2022.01)
*H04L 41/0816* (2022.01)
*H04L 41/084* (2022.01)

(52) U.S. Cl.
CPC ...... *H04L 63/1425* (2013.01); *H04L 41/0816* (2013.01); *H04L 41/0846* (2013.01);
(Continued)

(58) Field of Classification Search
CPC ............. H04L 63/1416; H04L 63/1425; H04L 63/1458; H04L 63/0236; H04L 63/0263;
(Continued)

(56) References Cited

U.S. PATENT DOCUMENTS 7,100,084 B2   8/2006   Unkle et al.
7,610,173 B2   10/2009  Gross et al.
(Continued)

FOREIGN PATENT DOCUMENTS

EP   3839838 A1   6/2021

OTHER PUBLICATIONS

Bakker, D. R. "Impact-based optimisation of BGP Flowspec rules for DDOS attack mitigation." Bachelor's thesis, University of Twente, 2019. (Year: 2019).*
(Continued)

*Primary Examiner* — Michael Simitoski
(74) *Attorney, Agent, or Firm* — Foley & Lardner LLP

(57) ABSTRACT

A method and apparatus for processing flow specification (Flowspec) messages to one or more of a plurality of customer networks by a controller device coupled to the plurality of customer networks. Preferably a network controller monitors network traffic flowing through each of the customer networks for detecting a network attack in one of the plurality of customer networks, via monitoring of the network traffic. Upon detection of a network attack, a Flowspec message is generated for the customer network detected to be under network attack wherein the Flowspec message is configured specifically for that customer network. The generated Flowspec message is transmitted to the customer network detected to be under network attack for implementation by the customer network for mitigation of the detected network attack.

14 Claims, 3 Drawing Sheets

(52) U.S. Cl.
CPC ...... *H04L 63/1416* (2013.01); *H04L 63/1458* (2013.01); *H04L 63/20* (2013.01)

(58) Field of Classification Search
CPC ............... H04L 63/20; H04L 2463/141; H04L 41/0816; H04L 41/0846; H04L 41/22; H04L 41/0876; G06F 21/552; G06F 21/554; G06F 3/0482
See application file for complete search history.

(56) References Cited

U.S. PATENT DOCUMENTS

| | | | | |
|---|---|---|---|---|
| 10,033,696 | B1* | 7/2018 | Burns | H04L 63/1441 |
| 11,870,642 | B2* | 1/2024 | Miriyala | H04L 63/0263 |
| 2005/0260996 | A1* | 11/2005 | Groenendaal | H04M 1/72457 |
| | | | | 455/445 |
| 2009/0106592 | A1 | 4/2009 | Gross et al. | |
| 2009/0300748 | A1* | 12/2009 | Diehl | H04L 63/0263 |
| | | | | 726/11 |
| 2011/0280150 | A1* | 11/2011 | Turk | H04L 63/1416 |
| | | | | 370/253 |
| 2013/0007257 | A1* | 1/2013 | Ramaraj | H04L 63/0263 |
| | | | | 709/224 |
| 2013/0031037 | A1* | 1/2013 | Brandt | H04L 63/1408 |
| | | | | 706/12 |
| 2013/0044758 | A1* | 2/2013 | Nguyen | H04L 45/306 |
| | | | | 370/401 |
| 2015/0350229 | A1* | 12/2015 | Mitchell | H04L 63/1416 |
| | | | | 726/23 |
| 2016/0020969 | A1* | 1/2016 | Vasseur | H04L 43/062 |
| | | | | 370/252 |
| 2016/0182300 | A1* | 6/2016 | Mopuri | H04L 47/32 |
| | | | | 370/235 |
| 2016/0261628 | A1* | 9/2016 | Doron | H04L 63/1458 |
| 2017/0063920 | A1* | 3/2017 | Thomas | H04L 63/1416 |
| 2017/0214713 | A1* | 7/2017 | Doron | H04L 63/1458 |
| 2019/0028381 | A1* | 1/2019 | Li | H04L 45/04 |
| 2019/0140960 | A1* | 5/2019 | Liang | H04L 12/4641 |
| 2019/0199746 | A1* | 6/2019 | Doron | G06N 20/00 |
| 2020/0021613 | A1* | 1/2020 | Tong | H04L 45/72 |
| 2020/0106863 | A1* | 4/2020 | Jain | G06F 9/44505 |
| 2020/0137118 | A1* | 4/2020 | Lyon | H04L 63/20 |
| 2020/0177626 | A1* | 6/2020 | Wichtlhuber | H04L 63/1441 |
| 2020/0213358 | A1* | 7/2020 | Helfinstine | H04L 9/3236 |
| 2021/0112091 | A1* | 4/2021 | Compton | H04L 63/1416 |
| 2021/0181694 | A1 | 6/2021 | Lillestolen et al. | |
| 2021/0182737 | A1 | 6/2021 | Lillestolen et al. | |
| 2021/0258251 | A1* | 8/2021 | Eastlake, III | H04L 45/74 |
| 2022/0021646 | A1* | 1/2022 | Joshi | H04L 67/1001 |
| 2022/0116417 | A1* | 4/2022 | Compton | H04L 63/1416 |
| 2022/0263803 | A1* | 8/2022 | Zhuang | H04L 63/1425 |
| 2023/0011397 | A1* | 1/2023 | Panse | H04L 63/20 |
| 2023/0156523 | A1* | 5/2023 | Xiong | H04L 45/38 |
| | | | | 370/329 |

OTHER PUBLICATIONS

Chouk, Wissem. "The use of BGP Flowspec in the protection against DDOS attacks." (2019). (Year: 2019).*
Van Gijtenbeek, Lennart, and Tim Dijkhuizen. "DDOS Defense Mechanisms for IXP Infrastructures." (2018). (Year: 2018).*
Noction. "DDOS Mitigation and BPG Flowspec", <https://www.noction.com/blog/ddos-mitigation>. Aug. 2019. (Year: 2019).*
Kock, Joeri. A signature-based Approach to DDOS Attack Mitigation Using BGP Flowspec Rules. MS thesis. University of Twente, 2019. (Year: 2019).*

* cited by examiner

FLOWSPEC MESSAGE PROCESSING APPARATUS AND METHOD

BACKGROUND

1. Field

The disclosed embodiments relate to the field of communications technologies, and in particular, to a flow specification (Flowspec) message processing method and system, and an apparatus.

2. Description of Related Art

The Border Gateway Protocol (BGP) is a dynamic routing protocol used between autonomous systems (AS). The Border Gateway Protocol (BGP) is widely applied to the Internet to transfer routing information between AS's and edge routers within an AS. The transferred routing information includes network layer reachability information (NLRI), such as Internet Protocol (IP) routing information, Media Access Control (MAC) routing information, a Flowspec rule. The BGP Flowspec rule is one of centralized traffic scheduling technologies based on a software-defined networking (SDN) architecture. A centralized SDN controller delivers a Flowspec rule to a forwarding device by using a BGP Flowspec message, to optimize and schedule a service flow.

Once a Flowspec rule is generated, it is delivered to all customer networks regardless of the unique and/or specific requirements of each different customer network coupled to a centralized SDN controller. Thus, currently no granularity of customization for a certain customer network is provided as Flowspec messages are deployed to all coupled customer networks.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, described is a method and apparatus for processing flow specification (Flowspec) messages to one or more of a plurality of customer networks by a controller device coupled to the plurality of customer networks. Preferably the network controller monitors network traffic flowing through each of the customer networks for detecting a network attack in one of the plurality of customer networks, via monitoring of the network traffic. Upon detection of a network attack, a Flowspec message is generated for the customer network detected to be under network attack wherein the Flowspec message is configured specifically for that customer network. The generated Flowspec message is transmitted to the customer network detected to be under network attack for implementation by the customer network for mitigation of the detected network attack.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Figure 1:
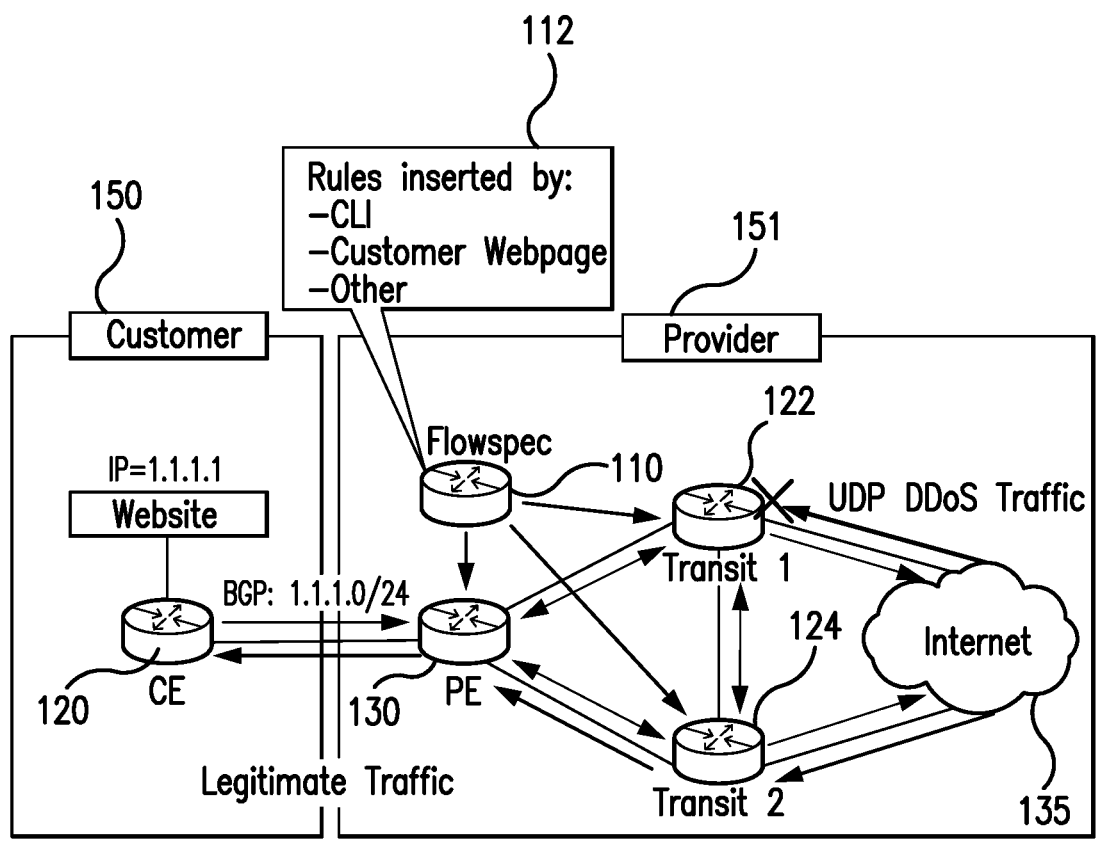
FIG. 1 is a generalized schematic diagram of a Flowspec message processing system used in accordance with an embodiment of the present disclosure.

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

It is to be further understood the illustrated embodiments of the present illustrated embodiments describe a system, apparatus and process for avoiding and mitigating the harmful effects of a network attack, such as a DDoS attack, on a customer network, with a granularity level specific for a customer network. In describing the illustrated embodiments, it is to be appreciated that current Flowspec mitigation controller devices enable customers (e.g., a customer network coupled to a Flowspec mitigation controller device provided by a network service provider) to configure the system to automatically create Flowspec mitigations based on observed attacks. However, currently, the existing configuration of these auto-Flowspec mitigations is deployment wide, meaning they are deployed to other customer networks. As described below, in accordance with the illustrated embodiments, a Flowspec mitigation controller device is provided that enables customer network operators to configure mitigations to behave differently at the granularity of an individual customer or host level. Preferably, it supports configuring Flowspec announcements for known attack (misuse) types as well as user-defined misuse types. It also preferably improves the ease of use and scalability of configuring auto-Flowspec mitigations allowing operators of customer networks to configure once and apply that configuration to a broad group of customers. For instance, the Flowspec controller device may be embodied in the Arbor Sightline/TMS monitoring device commercially available from NetScout Technologies Inc.

Turning now descriptively to the drawings, in which similar reference characters denote similar elements throughout the several views, FIG. 1 illustrates a generalized schematic diagram of a Flowspec message processing system 100 used in accordance with an embodiment of the present disclosure as described further below with reference to FIGS. 2 and 3.

It is to be understood that a Flowspec message 112 deployed by a Flowspec controller device 110, preferably in an Internet service provider 115, specifies procedures for the distribution of flow specification rules via Border Gateway Protocol (BGP) 120 and defines procedures to encode flow specification rules as Border Gateway Protocol Network Layer Reachability Information (BGP NLRI) which can be used in various applications. It also defines application for the purpose of packet filtering in order to mitigate network attacks, such (distributed) denial of service attacks. Thus, the BGP flow specification (Flowspec) feature enables rapid deployment and filter propagation, and policing functionality among a large number of BGP peer routers in various customer networks 150 to mitigate the effects of a distributed denial-of-service (DDoS) attack over a certain customer network. It is to be appreciated that for ease of illustration, FIG. 1 depicts an Internet service provider 115 having a Flowspec controller device 110 coupled to a single customer network 150, however and as illustrated and described with reference to FIGS. 2 and 3 below, the illustrated embodiments of the present disclosure are to be understood to be coupled to a plurality of different customer networks (e.g., 150, 160, 170 . . . n).

It is to be further appreciated that in traditional methods for DDoS mitigation, such as RTBH (remotely triggered blackhole), a BGP route is injected advertising the website address under attack with a special community. This special community on the border routers sets the next hop to a special next hop to discard/null, thus preventing traffic from suspect sources into your network. While this offers good protection, it makes the Server completely unreachable. However, BGP flowspec, on the other hand, allows for a more granular approach and enables a service provider 115 to effectively construct instructions to match a particular flow with source, destination, L4 parameters and packet specifics such as length, fragment and so on. For example, Flowspec allows for a dynamic installation of an action at the border routers to either: Drop the traffic; Inject it in a different Virtual Routing and Forwarding system (VRF) for analysis; or allow it, but police it at a specific defined rate. Thus, instead of sending a route with a special community that the border routers must associate with a next hop to drop in their route policy language, BGP flowspec sends a specific flow format to the border routers instructing them to create a sort of Access Control List (ACL) with class-map and policy-map to implement a rule desired to be advertised. In order to accomplish this, BGP Flowspec adds a new NLRI (Network Layer Reachability Information) to the BGP protocol.

With regard to the exemplary embodiment of FIG. 1, a Flowspec router (controller) 110 is configured preferably on the Provider Edge with flows (match criteria and actions). The Flowspec router 110 advertises these flows to the other edge routers and the AS (that is, Transit 1 (122), Transit 2 (124) and PE (130)). These transit routers then install the flows into the hardware. Once the flow is installed into the hardware, the transit routers (122, 124, 130) are able to do a lookup to see if incoming traffic matches the defined flows and take suitable action. For instance, the action in this scenario is to 'drop' the DDoS traffic at the edge of the network itself 115 and deliver only clean and legitimate traffic to the Customer Edge device 140 of a customer network 150.

With regards to how Flowspec mitigation works, it is to be generally understood that first, on the Flowspec router 110, the match-action criteria is defined to take on the incoming traffic. This comprises the PBR portion of the configuration. The service-policy type defines the actual PBR policy and contains the combination of match and action criteria which must be added to the flowspec. In this example, the policy is added under address-family IPv4, and hence it is propagated as an IPv4 flowspec rule.

```
Flowspec router CLI example:
    class-map type traffic match-all cm1
        match source-address ipv4 100.0.0.0/24
    policy-map type pbr pm1
        class type traffic cm1
        drop
    flowspec
        address-family ipv4
            service-policy type pbr pm0
Transient router CLI:
    flowspec
        address-family ipv4
            service-policy type pbr pm1
```

A flow specification is typically an n-tuple consisting of several matching criteria that can be applied to IP traffic. A given IP packet is said to match the defined flow if it matches all the specified criteria. A given flow may be associated with a set of attributes, depending on the particular application; such attributes may or may not include reachability information (that is, NEXT_HOP). Every flow-spec route is effectively a rule, consisting of a matching part (encoded in the NLRI field) and an action part (encoded as a BGP extended community). The BGP Flowspec rules are preferably converted internally to equivalent C3PL policy representing match and action parameters. The match and action support can vary based on underlying platform hardware capabilities.

A Flow Specification NLRI type may include several components such as destination prefix, source prefix, protocol, ports, and so on. This NLRI is treated as an opaque bit string prefix by BGP. Each bit string identifies a key to a database entry with which a set of attributes can be associated. This NLRI information may be encoded using MP_REACH_NLRI and MP_UNREACH_NLRI attributes. For instance, whenever the corresponding application does not require Next-Hop information, this is encoded as a 0-octet length Next Hop in the MP_REACH_NLRI attribute and ignored on receipt. The NLRI field of the MP_REACH_NLRI and MP_UNREACH_NLRI is encoded as a 1- or 2-octet NLRI length field followed by a variable-length NLRI value. The NLRI length is expressed in octets. A Flow specification NLRI-type typically consists of several optional sub-components. A specific packet is considered to match the flow specification when it matches the intersection (AND) of all the components present in the specification.

Figure 2:
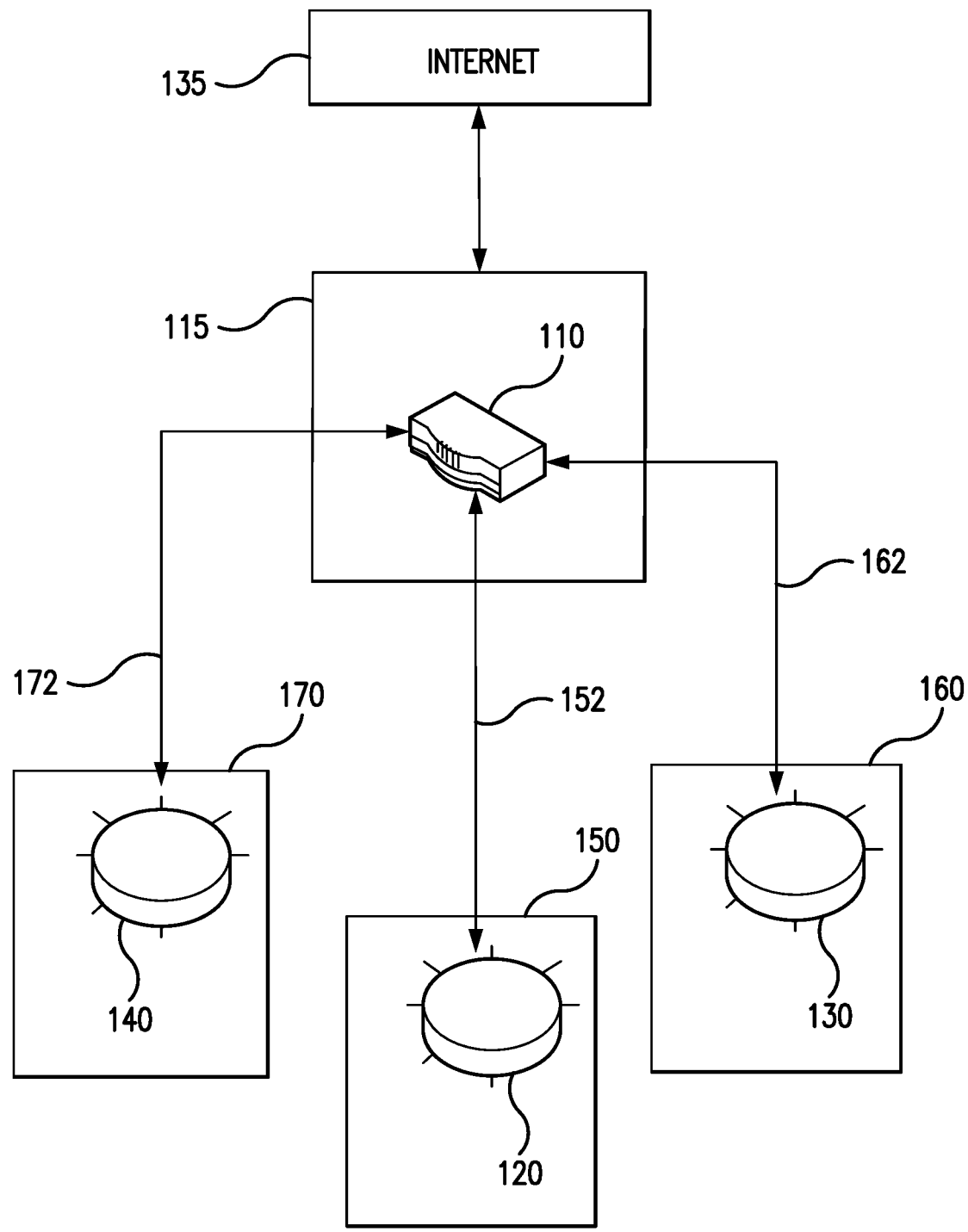
FIG. 2 is a schematic diagram of a system framework applied to a Flowspec message processing system of FIG. 1 according to an embodiment of the present disclosure.

With reference now to FIG. 2, shown is an exemplary schematic diagram of a system framework applied to a Flowspec message processing system 200 according to an embodiment of the present disclosure. Flowspec message processing system 200 is to be understood to be similar to Flowspec message processing system 115 with the exception that flowspec controller 110 of Internet service provider 115 is shown coupled to three exemplary customer networks (150, 160 and 170) each having a respective client edge device (120, 130 and 140) operatively coupled to the Flowspec controller 110 of Internet service provider 115 configured in accordance with an embodiment of the present disclosure described below with reference to the flowchart of FIG. 3.

In this embodiment of the present disclosure, while the Internet service provider 115 having a Flowspec controller device 110 is shown coupled to three (3) separate customer networks (150, 160, 170), it is to be understood that this is for ease of illustrative purposes only, as this embodiment of the present disclosure is not to be understood to be limited for coupling to the three illustrated customer networks. In contrast, it is to be understood the Flowspec controller device 110 of Internet service provider may be operatively coupled to a plurality (n) of different customer networks 150.

Figure 3:
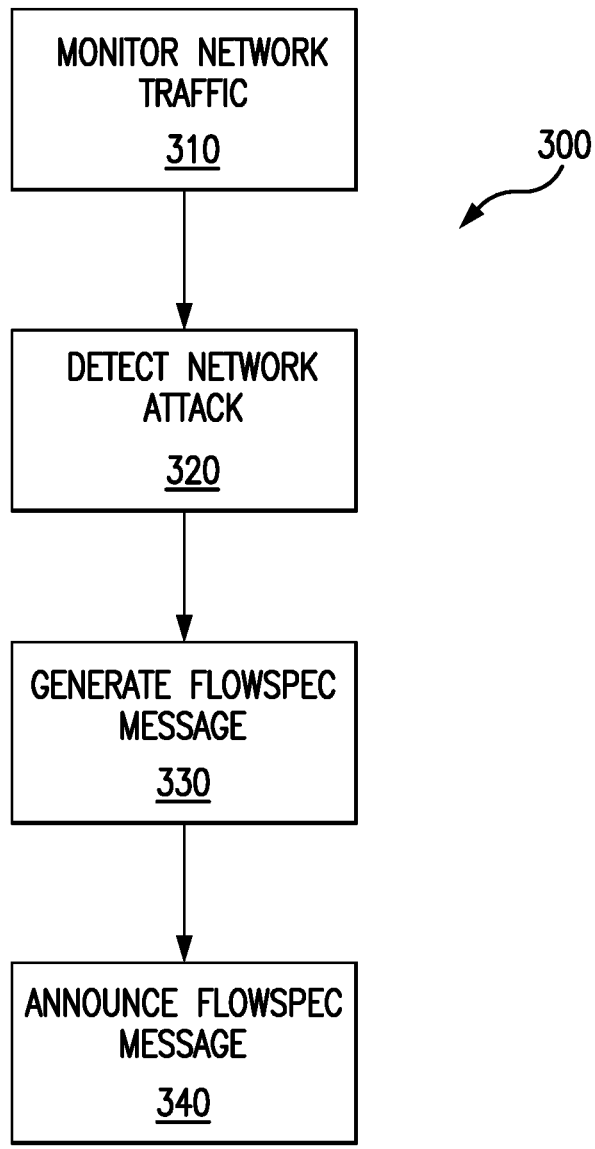
FIG. 3 is a schematic block flowchart of a Flowspec message processing method according to the embodiment of FIG. 2 of the present disclosure.

Turning to FIG. 3 now (and with continued reference to FIGS. 1 and 2), illustrated is an exemplary and non-limiting flowchart depicting a method 300 for mitigating network attacks in a plurality of customers networks (e.g., 150, 160 and 170) coupled to an Internet service provider 115 using Flowspec rulesets that are configured to behave differently at the granularity of an individual customer or host level in accordance with certain illustrated embodiments of the present disclosure. Specifically, described is a method 300 for processing flow specification (FlowSpec) messages 112 to one or more of a plurality of customer networks (150, 160 and 170) by a centralized controller device 110 coupled to the plurality of customer networks (150, 160 and 170).

Before turning to description of FIG. 3, it is noted that the flow diagram in FIG. 3 illustrates exemplary operational steps carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

Starting at step 310, network traffic flowing (152, 162, 172) from the Internet 135 through each of the customer networks (150, 160 and 170) is monitored by a controller device 110 that is preferably configured to generate and announce Flowspec messages 112 for mitigating network attacks (e.g., DDoS attacks) caused by malicious network traffic flowing from the Internet 135 to the customer networks (150, 160 and 170). Preferably, the controller device 110 is provided in an Internet service provider 115 coupled to each of the customer networks (150, 160 and 170).

Next, at step 320, the controller device 110 via monitoring of the network traffic flowing (152, 162, 172) to each of the customer networks (150, 160 and 170) (step 310), is configured and operable to detect a network attack upon one of the coupled customer networks (150, 160, 170) preferably via detecting malicious traffic elements (e.g., a DDoS attack) in the network traffic flowing (152, 162, 172) to each of the customer networks (150, 160 and 170). Upon detection of a network attack upon one or more of the coupled customer networks (150, 160, 170) (step 320), the controller device 110 in accordance with the illustrated embodiment of the present disclosure is configured and operable to generate a Flowspec message 112 for the customer network (150, 160, and/or 170) detected to be under network attack wherein the Flowspec message 112 is configured specifically for that customer network (150, 160, 170) determined to be subject to a network attack, step 330. In accordance with an illustrated embodiment, generating a Flowspec message 112 for the customer network (150, 160, 170) subject to a network attack may include selecting a Flowspec message from a stack of pre-existing Flowspec messages (via a memory/database coupled to controller 110) and reconfiguring the selected Flowspec message utilizing specific criteria determined for the customer network (150, 160, 170) subject to the network attack, wherein the specific criteria for the customer network is preferably determined by the network service provider 115 via the monitoring of network traffic (152, 162, 172) flowing to the customer network (150, 160, 170). Additionally in accordance with an illustrated embodiment, the controller device 110 may be configured and operable to store the reconfigured FlowSpec message in the aforesaid stack of pre-existing FlowSpec messages whereby it is adaptable to be selected for use by the controller device 110 for another customer network (150, 160, 170), contingent upon being reconfigured in view of specific criteria for that another customer network.

Once the Flowspec has been generated (step 330), next at step 340 the generated Flowspec message 112 is transmitted (e.g., announced) to the customer network (150, 160, 170) determined to be subject to a network attack (step 320) for implementation by that customer network for mitigation of the detected network attack. Specifically, the generated Flowspec message is preferably transmitted to, and implemented in, one or more router devices (e.g., 122, 124, 130, FIG. 1) in the network service provider 115 such that the one or more router devices (e.g., 122, 124, 130, FIG. 1) in the network service provider 115 are also now configured and operable to perform mitigation of the detected network attack upon network traffic flowing (e.g., 152) through the customer network (e.g, 150) detected to be under network attack while not affecting network traffic flowing (e.g., 162, 172) through the other customer networks (e.g., 160, 170) coupled to the network service provider 115.

In accordance with an illustrated embodiment of the present disclosure, generating and transmitting a Flowspec message 112 (steps 330, 340) includes generating a BGP Flowspec for port 53/UDP for an edge router device (e.g., 120, FIG. 1) in the customer network (e.g., 150) determined to be under network attack and one or more router devices (e.g., 122, 124, 130, FIG. 1) in the network service provider 115. Further in accordance with an illustrated embodiment of the present disclosure, generating a Flowspec message 112 for the customer network (e.g., 150) includes storing the Flowspec message in a stack of pre-existing Flowspec messages whereby the stored Flowspec message is adaptable use by another customer network (e.g., 160, 170) contingent upon being reconfigured in view of specific criteria for that another customer network.

As mentioned above, it is to be appreciated and understood the generated Flowspec message 112 is preferably an n-tuple consisting of several matching criteria to be applied to IP traffic in the edge device (e.g., 120, FIG. 1) of the customer network (e.g., 150) determined to be under network attack and one or more router devices (e.g., 122, 124, 130, FIG. 1) in the network service provider 115, whereby the Flowspec message 112 is preferably distributed as a BGP NLRI in a BGP announcement message. It is additionally to be understood and appreciated that the generated Flowspec message (step 330) implements a filter for mitigation of a network attack (e.g., a DDoS attack) preferably in the edge device (e.g., 120, FIG. 1) in the customer network (e.g., 150) determined to be under network attack, as well as one or more router devices (e.g., 122, 124, 130, FIG. 1) in the network service provider 115.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

In summary, various embodiments of the present disclosure provide a novel approach for generating Flowspec messages 112 on a per customer basis so as to prescribe misuse settings unique for that customer network (e.g., 150, 160, 170). For example, one customer (e.g., 150) may perform a significant amount fragments and thus requires such a filter setting to be disabled or set exceptionally high, whereby a default value for such a Flowspec message prescribes a more aggressive filtering technique for such fragments. Thus, the illustrated embodiments of the present disclosure provide Flowspec mitigations on per customer basis (e.g., 150) who experience unique attacks without filtering across other customers (e.g., 160, 170). Thus, such individual alert triggers mitigations enabling stacking of Flowspec announcements for achieving fine-grained filtering of network traffic relative to prior art known techniques. This preferably enables re-use of individual Flowspec messages across a plurality of other customer networks in a more targeted way with lower overhead, in contrast to prior art known techniques.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing flow specification (FlowSpec) messages to one or more customer networks of a plurality of customer networks by a controller device coupled to the plurality of customer networks, comprising:
   monitoring, by the controller device, a plurality of Internet Protocol (IP) packets flowing through the one or more customer networks of the plurality of customer networks;
   detecting, by the controller device, based on one or more first attributes of an IP packet of the plurality of IP packets, a network attack in a first customer network of the plurality of customer networks;
   retrieving, by the controller device, responsive to detecting the network attack, from a database comprising a stack of pre-existing Flowspec messages, a first Flowspec message associated with the one or more first attributes of the IP packet;
   generating, by the controller device, responsive to retrieving the first Flowspec message, a second Flowspec message for the first customer network by adjusting one or more aspects of the first Flowspec message, the second Flowspec message generated based on a match between one or more characteristics of the first customer network and one or more second attributes of the first Flowspec message, the one or more characteristics of the first customer network determined by a network service provider connected to the one or more customer networks and the controller device;
   transmitting, by the controller device, the second Flowspec message to cause the first customer network to implement one or more actions specific to the first customer network to mitigate the network attack in the first customer network; and
   storing, by the controller device, the second Flowspec message in the stack of pre-existing Flowspec messages, wherein the second Flowspec message is adaptable to be selected for use by the controller device for a second customer network of the plurality of customer networks, contingent upon the second Flowspec message being reconfigured in view of specific criteria for the second customer network.

2. The method as recited in claim 1, wherein the controller device is provided in the network service provider, and wherein the network service provider provides Internet service to the plurality of customer networks.

3. The method as recited in claim 2, comprising:
   transmitting, by the controller device, the second Flowspec message to one or more router devices in the network service provider such that the one or more router devices in the network service provider are also enabled to perform mitigation of the network attack upon first network traffic flowing through the first customer network while not affecting second network traffic flowing through one or more second customer networks of the plurality of customer networks.

4. The method as recited in claim 3, wherein retrieving the first Flowspec message includes:
   selecting, by the controller device, the first Flowspec message from the stack of pre-existing Flowspec messages.

5. The method as recited in claim 3, wherein generating the second Flowspec message includes:
   generating, by the controller device, a BGP Flowspec for port 53/UDP for an edge router device in the first customer network and the one or more router devices in the network service provider.

6. The method as recited in claim 5, wherein the second Flowspec message is an n-tuple consisting of several matching criteria to be applied to IP traffic in the edge router device of the first customer network and the one or more router devices in the network service provider.

7. The method as recited in claim 6, wherein the second Flowspec message is distributed as a BGP NLRI in a BGP announcement message.

8. The method as recited in claim 7, wherein the second Flowspec message implements a filter for mitigation of a DDOS network attack in the edge router device in the first customer network and one or more edge router devices in the network service provider.

9. A network controller device coupled to a plurality of customer networks for processing flow specification (Flowspec) messages to one or more customer networks of the plurality of customer networks, comprising:
   one or more databases having memory configured to store instructions; and
   a processor disposed in communication with the memory, wherein the processor upon execution of the instructions is configured to:
      monitor a plurality of Internet Protocol (IP) packets flowing through the one or more customer networks of the plurality of customer networks;
      detect, based on one or more first attributes of an IP packet of the plurality of IP packets, a network attack in a first customer network of the plurality of customer networks;
      retrieve, responsive to detection of the network attack, from a database comprising a stack of pre-existing Flowspec messages, a first Flowspec message associated with the one or more first attributes of the IP packet;
      generate, responsive to retrieval of the first Flowspec message, a second Flowspec message for the first customer network by adjusting one or more aspects of the first Flowspec message, the second Flowspec message generated based on a match between one or more characteristics of the first customer network and one or more second attributes of the first Flowspec message, the one or more characteristics of the first customer network determined by a network service provider connected to the one or more customer networks and the network controller device;
      transmit the second FlowSpec message to cause the first customer network to implement one or more actions specific to the first customer network to mitigate the network attack in the first customer network; and
      store the second Flowspec message in the stack of pre-existing Flowspec messages, wherein the second Flowspec message is adaptable to be selected for use by the network controller device for a second customer network of the plurality of customer networks, contingent upon the second Flowspec message being reconfigured in view of specific criteria for the second customer network.

10. The network controller device as recited in claim 9, wherein the network controller device is provided in the network service provider, and wherein the network service provider provides Internet service to the plurality of customer networks.

11. The network controller device as recited in claim 10, wherein the processor is configured to:

transmit the second Flowspec message to one or more router devices in the network service provider such that the one or more router devices in the network service provider are also enabled to perform mitigation of the network attack upon first network traffic flowing through the first customer network while not affecting second network traffic flowing through one or more second customer networks of the plurality of customer networks.

12. The network controller device as recited in claim 11, the processor configured to retrieve the first Flowspec message for the first customer network by:

selecting the first Flowspec message from the stack of pre-existing Flowspec messages.

13. The network controller device as recited in claim 11, the processor configured to generate the second Flowspec message by:

generating a BGP Flowspec for port 53/UDP for an edge router device in the first customer network and the one or more router devices in the network service provider and wherein the second Flowspec message is distributed as a BGP NLRI in a BGP announcement message.

14. The network controller device as recited in claim 13, wherein the second Flowspec message is an n-tuple consisting of several matching criteria to be applied to IP traffic in the edge router device of the first customer network and one or more edge router devices in the network service provider and wherein the second Flowspec message implements a filter for mitigation of a DDOS network attack in the edge router device of the first customer network and the one or more edge router devices in the network service provider.

* * * * *